United States Patent [19]
Kurohmaru et al.

[11] Patent Number: 5,432,726
[45] Date of Patent: Jul. 11, 1995

[54] ARITHMETIC UNIT FOR QUANTIZATION/INVERSE QUANTIGATION

[75] Inventors: Shun-ichi Kurohmaru; Hisashi Kodama; Toshiyuki Araki; Masaki Toyokura, all of Osaka, Japan

[73] Assignee: Matsushita Electric Industrial Co., Ltd., Kadoma, Japan

[21] Appl. No.: 251,311

[22] Filed: May 31, 1994

[30] Foreign Application Priority Data

Jun. 1, 1993 [JP] Japan .................. 5-130342
Apr. 14, 1994 [JP] Japan .................. 6-075592

[51] Int. Cl.⁶ .............................................. G06K 9/36
[52] U.S. Cl. .................. 364/745; 364/715.02; 382/251
[58] Field of Search ........... 364/745, 736.5, 715.02; 382/56, 50

[56] References Cited

U.S. PATENT DOCUMENTS

| | | | |
|---|---|---|---|
| 4,034,196 | 7/1977 | Butterweck et al. | 364/745 |
| 4,569,052 | 2/1986 | Cohn et al. | 371/38 |
| 4,775,810 | 10/1988 | Suzuki et al. | 307/471 |
| 5,054,103 | 10/1991 | Yasuda et al. | 382/56 |
| 5,349,545 | 9/1994 | Keith | 364/715.02 |

FOREIGN PATENT DOCUMENTS 3-71329  3/1991  Japan .
4-180125 6/1992  Japan .
4-245534 9/1992  Japan .
4-246722 9/1992  Japan .

*Primary Examiner*—David H. Malzahn
*Attorney, Agent, or Firm*—Willian Brinks Hofer Gilson & Lione

[57] ABSTRACT

Two sets of input data A and B are provided. A first selector circuit outputs either the most significant bit of the input data B or the inversion thereof, in accordance with a control signal which has been sent thereto through a control line. An adder adds 1 to the least significant bit of the input data B, and also adds the output from the first selector circuit to all the other bits thereof. A zero-judgment circuit judges whether the input data B is 0 or not, and then, if it is 0, sets a flag to a predetermined value. A selector-control circuit allows a second selector circuit to select the input data B in the case where the least significant bit of the input data A is 1 or the flag from the zero-judgment circuit is set to the predetermined value, and to select, in the other cases, the output from the adder. In this manner, a conditional branch operation required for quantization and inverse quantization of data is executed at high speed, which operation involves either adding 1 to or subtracting 1 from the input data B to output the result, or outputting the input data B, depending on whether the input data B is positive, negative or zero, and also depending on whether the input data A is an even number or an odd number.

4 Claims, 8 Drawing Sheets

FIG.8 A

PRIOR ART

OPERATION 1

| INPUT DATA | | OUTPUT DATA |
|---|---|---|
| A | B | |
| ODD | | B |
| EVEN | POSITIVE | B+1 |
| | 0 | 0 |
| | NEGATIVE | B-1 |

FIG.8 B

PRIOR ART

OPERATION 2

| INPUT DATA | | OUTPUT DATA |
|---|---|---|
| A | B | |
| ODD | | B |
| EVEN | POSITIVE | B-1 |
| | 0 | 0 |
| | NEGATIVE | B+1 | ically, both the above-described Operations 1 and 2

ARITHMETIC UNIT FOR QUANTIZATION/INVERSE QUANTIGATION

BACKGROUND OF THE INVENTION

The present invention relates to an arithmetic unit which is used for quantization and inverse quantization of data.

FIG. 6 shows the basic structure of the arithmetic-logic section of a conventional signal processor using a microprogram system. In FIG. 6, the reference numeral 61 denotes an arithmetic-logic unit (ALU) and the reference numeral 62 denotes a control circuit for controlling the type of operation to be executed by the ALU 61.

The control circuit 62 controls the execution of an operation in the ALU 61 while sequentially decoding the instructions which constitute a program stored in a memory (not shown). The ALU 61 executes, on input data A and B, an operation designated by the control circuit 62, and then outputs the result of the operation as output data F. The input data A and B and the output data F are, for example, binary numbers (fixed-point numbers) in the form of two's complements.

MPEG1 is known as one of the international standards for moving picture image coding. The arithmetic-logic section shown in FIG. 6 is capable of executing quantization and inverse quantization of image data on the basis of MPEG1.

FIG. 7 is a data flow diagram illustrating an image data decoding process. In FIG. 7, the reference numeral 71 denotes a VLD section, 72 a $ZZ^{-1}$ section, 73 a $Q^{-1}$ section, 74 a mismatch control section, 75 an SAT (saturation) section, 76 an IDCT section, and 77 a reference memory section. The $Q^{-1}$ section 73, the mismatch control section 74 and the SAT section 75 execute an inverse quantization process. The mismatch control section 74 limits the output from the $Q^{-1}$ section 73 to an even or odd number in order to prevent a mismatch from arising in the IDCT section 76. Accordingly, the mismatch control section 74 executes conditional branch operations such as shown in FIGS. 8A and 8B. Quantization of image data also requires such conditional branch operations.

Operation 1 shown in FIG. 8A is a conditional branch operation to be executed depending on whether the input data B is positive, negative or zero, and also depending on whether the input data A is an even number or an odd number. Specifically, if the input data A is an odd number, the input data B is output as the output data F regardless of the value of the input data B. If the input data A is an even number, the output data F is determined depending on whether the input data B is positive, negative or zero. In other words, if the input data A is an even number and the input data B is a positive number, then 1 is added to the input data B, so that the result B+1 is output. If the input data A is an even number and the input data B is 0, then 0 (=B) is output. If the input data A is an even number and the input data B is a negative number, then 1 is subtracted from the input data B, so that the result B−1 is output.

Operation 2 shown in FIG. 8B is, as in Operation 1 described above, a conditional branch operation to be executed depending on whether the input data B is positive, negative or zero, and also depending on whether the input data A is an even number or an odd number. In Operation 2, however, the condition used in Operation 1 to obtain the output data B+1 is used as the condition for the output data B−1, while the condition used in Operation 1 to obtain the output data B−1 is used as the condition for the output data B+1.

In the case where Operation 1 shown in FIG. 8A is executed by the arithmetic-logic section of FIG. 6, the following program (procedure) is used.

Operation 1

STEP 1: If the least significant bit (LSB) of the input data A is: 1, then go to STEP 5; and 0, then go to the next STEP.

STEP 2: Judge whether the input data B is 0 or not.

STEP 3: If the zero-judgment flag for the input data B is: 1, then go to STEP 5; and 0, then go to the next STEP.

STEP 4: If the most significant bit (MSB) of the input data B is: 0, then go to STEP 6; and 1, then go to STEP 7.

STEP 5: Write B to the register, and go to STEP 8.

STEP 6: Write B+1 to the register, and go to STEP 8.

STEP 7: Write B−1 to the register, and go to the next STEP.

STEP 8:

In the case where Operation 2 shown in FIG. 8B is executed by the arithmetic-logic section of FIG. 6, the following program (procedure) is used.

Operation 2

STEP 1: If the least significant bit of the input data A is: 1, then go to STEP 5; and 0, then go to the next STEP.

STEP 2: Judge whether the input data B is 0 or not.

STEP 3: If the zero-judgment flag for the input data B is: 1, then go to STEP 5; and 0, then go to the next STEP.

STEP 4: If the most significant bit of the input data B is: 1, then go to STEP 6; and 0, then go to STEP 7.

STEP 5: Write B to the register, and go to STEP 8.

STEP 6: Write B+1 to the register, and go to STEP 8.

STEP 7: Write B−1 to the register, and go to the next STEP.

STEP 8:

Both of the above two programs include conditional branch instructions.

Image data processing is required to be performed at high speed. Signal processors receive a large volume of data in a series of data sets, and are accordingly required to process each data set in a short time.

The above-described conventional signal processor, however, uses the microprogram system, so that it involves a problem in that not only a large program area but also a long data-processing time is required. Especially, the execution of conditional branch instructions is one factor which causes delay in processing. Specifically, both the above-described Operations 1 and 2 require a program area for 7 STEPs and a maximum execution cycle of 5 STEPs.

SUMMARY OF THE INVENTION

It is an object of the present invention to provide an arithmetic unit which is capable of executing, at high speed, conditional branch operations required for quantization and inverse quantization of data.

In order to achieve the above object, the arithmetic unit according to the present invention has a hardware structure capable of executing, in one cycle and on the basis of a single instruction, a conditional branch operation by which 1 is added to or subtracted from first input data B so that the result is output, or the first input data B is output, depending on whether the first input data B is positive, negative or zero, and also depending on whether second input data A is an even number or an odd number. Therefore, the conditional branch operations required for quantization and inverse quantization of data can be executed at high speed. Furthermore, the storage area required for a program can be reduced as compared with that required for the above-described programs using conditional branch instructions.

Specifically, a first arithmetic unit according to the present invention has a structure comprising first and second selector circuits, an adder, a zero-Judgment circuit and a selector-control circuit such as described below. The first selector circuit receives the most significant bit of the first input data B, and then, in accordance with a first control signal, selects and outputs either the thus received most significant bit or the inversion thereof. The adder receives the first input data B and the output from the first selector circuit, and then adds 1 to the least significant bit of the first input data B and also adds the output from the first selector circuit to all the other bits of the first input data B, and thereafter outputs the result of the addition. The second selector circuit receives the first input data B and the output from the adder, and selects, in accordance with a second control signal, either the first input data B or the output from the adder, and then outputs it as an output from the arithmetic unit. The zero-judgment circuit receives the first input data B, and judges whether it is 0 or not, and then, if it is 0, sets a flag to a predetermined value. The selector-control circuit receives the least significant bit of the second input data A and the flag from the zero-judgment circuit, and then provides the above-mentioned second control signal to the second selector circuit so as to allow it to select the first input data B in the case where the least significant bit of the second input data A is 1 or the flag from the zero-judgment circuit is set to the predetermined value, and to select, in the other cases, the output from the adder.

In the first arithmetic unit described above, either Operation 1 shown in FIG. 8A or Operation 2 shown in FIG. 8B is selected in accordance with the first control signal supplied to the first selector circuit.

In the first arithmetic unit, in the case where Operation 1 is selected, the first selector circuit outputs the most significant bit of the first input data B. Thus, if the first input data B is positive or 0 (i.e., if the most significant bit of the first input data B is 0), the adder adds 1 to the least significant bit of the first input data B, and 0 to all the other bits thereof, and accordingly outputs the result of the addition, i.e., B+1. On the other hand, if the first input data B is negative (i.e., if the most significant bit of the first input data B is 1), the adder adds 1 to all the bits of the first input data B, and accordingly outputs the result of the addition, i.e., B−1. The second selector circuit selects the first input data B (it selects 0 when B=0) in the case where the second input data A is an odd number or the first input data B is 0. In the other cases, the second selector circuit selects the output from the adder, i.e., B+1 or B−1.

In the first arithmetic unit, in the case where Operation 2 is selected, the first selector circuit outputs the inversion of the most significant bit of the first input data B. Thus, if the first input data B is positive or 0 (i.e., if the most significant bit of the first input data B is 0), the adder adds 1 to all the bits of the first input data B, and accordingly outputs the result of the addition, i.e., B−1. On the other hand, if the first input data B is negative (i.e., if the most significant bit of the first input data B is 1), the adder adds 1 to the least significant bit of the first input data B, and 0 to all the other bits thereof, and accordingly outputs the result of the addition, i.e., B+1. The second selector circuit selects the first input data B (it selects 0 when B=0) in the case where the second input data A is an odd number or the first input data B is 0. In the other cases, the second selector circuit selects the output from the adder, i.e., B−1 or B+1.

A second arithmetic unit according to the present invention has a structure comprising first and second selector circuits, an adder, a zero-judgment circuit and a selector-control circuit such as described below. The first selector circuit receives the most significant bit of the first input data B, and then, in accordance with a first control signal, selects and outputs either the thus received most significant bit or the inversion thereof. The adder receives the constant data −1, the first input data B and the output from the first selector circuit, and adds −1 and the first input data B, and then adds the output from the first selector circuit to the second least significant bit of the result of the addition, and thereafter outputs the final result of these additions. The second selector circuit receives the first input data B and the output from the adder, and selects, in accordance with a second control signal, either the first input data B or the output from the adder, and then outputs it as an output from the arithmetic unit. The zero-judgment circuit receives the first input data B, and judges whether it is 0 or not, and then, if it is 0, sets a flag to a predetermined value. The selector-control circuit receives the least significant bit of the second input data A and the flag from the zero-judgment circuit, and then provides the above-mentioned second control signal to the second selector circuit so as to allow it to select the first input data B in the case where the least significant bit of the second input data A is 1 or the flag from the zero-judgment circuit is set to the predetermined value, and to select, in the other cases, the output from the adder.

In the second arithmetic unit described above, either Operation 1 shown in FIG. 8A or Operation 2 shown in FIG. 8B is selected in accordance with the first control signal supplied to the first selector circuit.

In the second arithmetic unit, in the case where Operation 1 is selected, the first selector circuit outputs the inversion of the most significant bit of the first input data B. Thus, if the first input data B is positive or 0 (i.e., if the most significant bit of the first input data B is 0), the adder adds the first input data B, −1 and 2, and accordingly outputs the result of the addition, i.e., B+1. On the other hand, if the first input data B is negative (i.e., if the most significant bit of the first input data B is 1), the adder adds the first input data B, −1 and 0, and accordingly outputs the result of the addition, i.e., B−1. The second selector circuit selects the first input data B (it selects 0 when B=0) in the case where the second input data A is an odd number or the first input data B is 0. In the other cases, the second selector circuit selects the output from the adder, i.e., B+1 or B−1.

In the second arithmetic unit, in the case where Operation 2 is selected, the first selector circuit outputs the most significant bit of the first input data B. Thus, if the first input data B is positive or 0 (i.e., if the most significant bit of the first input data B is 0), the adder adds the first input data B, −1 and 0, and accordingly outputs the result of the addition, i.e., B−1. On the other hand, if the first input data B is negative (i.e., if the most significant bit of the first input data B is 1), the adder adds the first input data B, −1 and 2, and accordingly outputs the result of the addition, i.e., B+1. The second selector circuit selects the first input data B (it selects 0 when B=0) in the case where the second input data A is an odd number or the first input data B is 0. In the other cases, the second selector circuit selects the output from the adder, i.e., B−1 or B+1.

A third arithmetic unit according to the present invention has a structure comprising first and second selector circuits, first and second selector-control circuits, an adder and a zero-judgment circuit such as described below. The first selector circuit receives 1 and −1 as first and second constant data, respectively, and then, in accordance with a first control signal, selects and outputs either the first constant data or the second constant data. The first selector-control circuit receives the most significant bit of the first input data B, and then provides the above-mentioned first control signal to the first selector circuit so as to allow it to select the first or second constant data depending on whether the most significant bit of the first input data B is 1 or 0. The adder receives the first input data B and the output from the first selector circuit, adds the first input data B and the output from the first selector circuit, and outputs the result of the addition. The second selector circuit receives the first input data B and the output from the adder, and selects, in accordance with a second control signal, either the first input data B or the output from the adder, and then outputs it as an output from the arithmetic unit. The zero-judgment circuit receives the first input data B, and judges whether it is 0 or not, and then, if it is 0, sets a flag to a predetermined value. The second selector-control circuit receives the least significant bit of the second input data A and the flag from the zero-judgment circuit, and then provides the above-mentioned second control signal to the second selector circuit so as to allow it to select the first input data B in the case where the least significant bit of the second input data A is 1 or the flag from the zero-judgment circuit is set to the predetermined value, and to select, in the other cases, the output from the adder.

In the third arithmetic unit described above, in the case where Operation 1 shown in FIG. 8A is executed, the first selector-control circuit controls the first selector circuit so as to allow it to select 1 when the first input data B is positive or 0, and to select −1 when the first input data B is negative. Thus, the adder outputs B+1 when the first input data B is positive or 0, and outputs B−1 when it is negative. The second selector circuit selects the first input data B (it selects 0 when B=0) in the case where the second input data A is an odd number or the first input data B is 0. In the other cases, the second selector circuit selects the output from the adder, i.e., B+1 or B−1.

In the third arithmetic unit, in the case where Operation 2 shown in FIG. 8B is executed, the first selector-control circuit controls the first selector circuit so as to allow it to select −1 when the first input data B is positive or 0, and to select 1 when the first input data B is negative. Thus, the adder outputs B−1 when the first input data B is positive or 0, and outputs B+1 when it is negative. The second selector circuit selects the first input data B (it selects 0 when B=0) in the case where the second input data A is an odd number or the first input data B is 0. In the other cases, the second selector circuit selects the output from the adder, i.e., B−1 or B+1.

A fourth arithmetic unit according to the present invention has a structure comprising an adder, a subtracter, a zero-judgment circuit, a selector circuit and a selector-control circuit such as described below. The adder receives the first input data B and the constant data 1, adds the first input data B and 1, and outputs the result of the addition. The subtracter receives the first input data B and the constant data 1, subtracts 1 from the first input data B, and outputs the result of the subtraction. The selector circuit receives the first input data B and the outputs from both the adder and the subtracter, and selects, in accordance with a control signal, either the first input data B, the output from the adder or the output from the subtracter, and then outputs it as an output from the arithmetic unit. The zero-judgment circuit receives the first input data B, and judges whether it is 0 or not, and then, if it is 0, sets a flag to a predetermined value. The selector-control circuit receives the least significant bit of the second input data A, the flag from the zero-judgment circuit and the most significant bit of the first input data B, and then provides the above-mentioned control signal to the selector circuit so as to allow it to select the first input data B in the case where the least significant bit of the second input data A is 1 or the flag from the zero-judgment circuit is set to the predetermined value, and to select, in the other cases, either the output from the adder or the output from the subtracter depending on whether the most significant bit of the first input data B is 1 or 0.

In the fourth arithmetic unit described above, the adder and the subtracter output B+1 and B−1, respectively. The selector-control circuit controls the selector circuit so as to allow it to select the first input data B in the case where the second input data A is an odd number or the first input data B is 0. In the other cases, the selector-control circuit controls the selector circuit so as to allow it to select either the output from the adder, i.e., B+1, or the output from the subtracter, i.e., B−1, depending on whether the arithmetic unit executes Operation 1 shown in FIG. 8A or Operation 2 shown in FIG. 8B, and also depending on whether the most significant bit of the first input data B is 1 or 0. Specifically, in the case where Operation 1 shown in FIG. 8A is executed, the selector circuit is controlled so as to select the output from the adder, i.e., B+1, when the most significant bit of the first input data B is 0 (i.e., when the first input data B is positive), and so as to select the output from the subtracter, i.e., B−1, when the most significant bit of the first input data B is 1 (i.e., when the first input data B is negative). On the other hand, in the case where Operation 2 shown in FIG. 8B is executed, the selector circuit is controlled so as to select the output from the subtracter, i.e., B−1, when the most significant bit of the first input data B is 0, and so as to select the output from the adder, i.e., B+1, when the most significant bit of the first input data B is 1.

In the above-described first arithmetic unit, only one adder having two inputs is necessary, so that the scale of the hardware can be reduced.

The above-described fourth arithmetic unit has a circuit structure where the selector circuit is provided only for the execution of the final step of an operation, so that the other steps of the operation can be executed through parallel processing. As a result, the entire operation can be executed at higher speed.

BRIEF DESCRIPTION OF THE DRAWINGS

FIGS. 8A and 8B show the details of conditional branch operations which are executed in the mismatch control section shown in FIG. 7.

DETAILED DESCRIPTION OF THE INVENTION

The following describes four arithmetic units for executing the conditional branch operations 1 and 2 respectively shown in FIGS. 8A and 8B.

EXAMPLE 1

Figure 1:
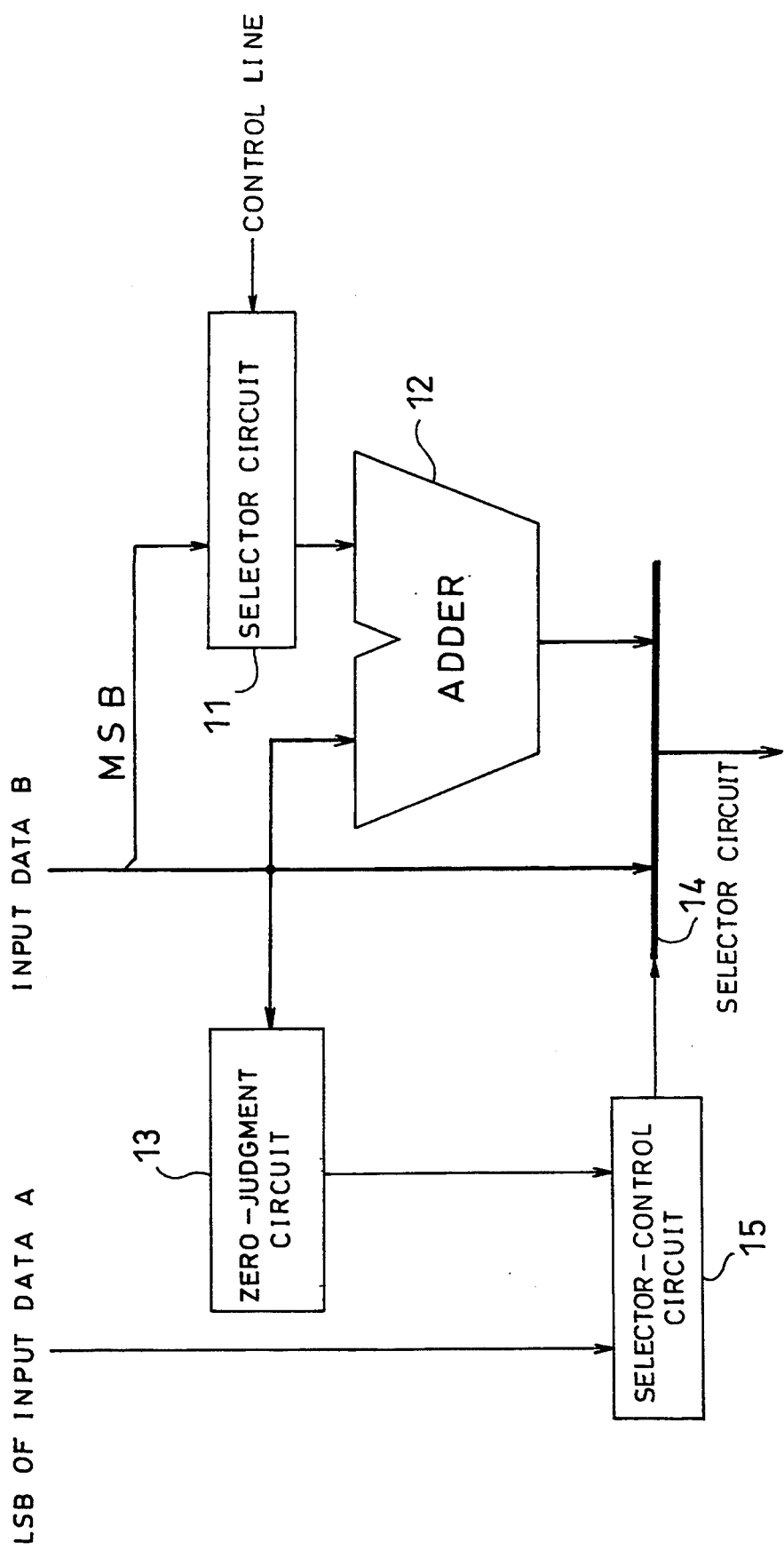
FIG. 1 is a block diagram showing the structure of an arithmetic unit according to a first embodiment of the present invention.
Figure 2:
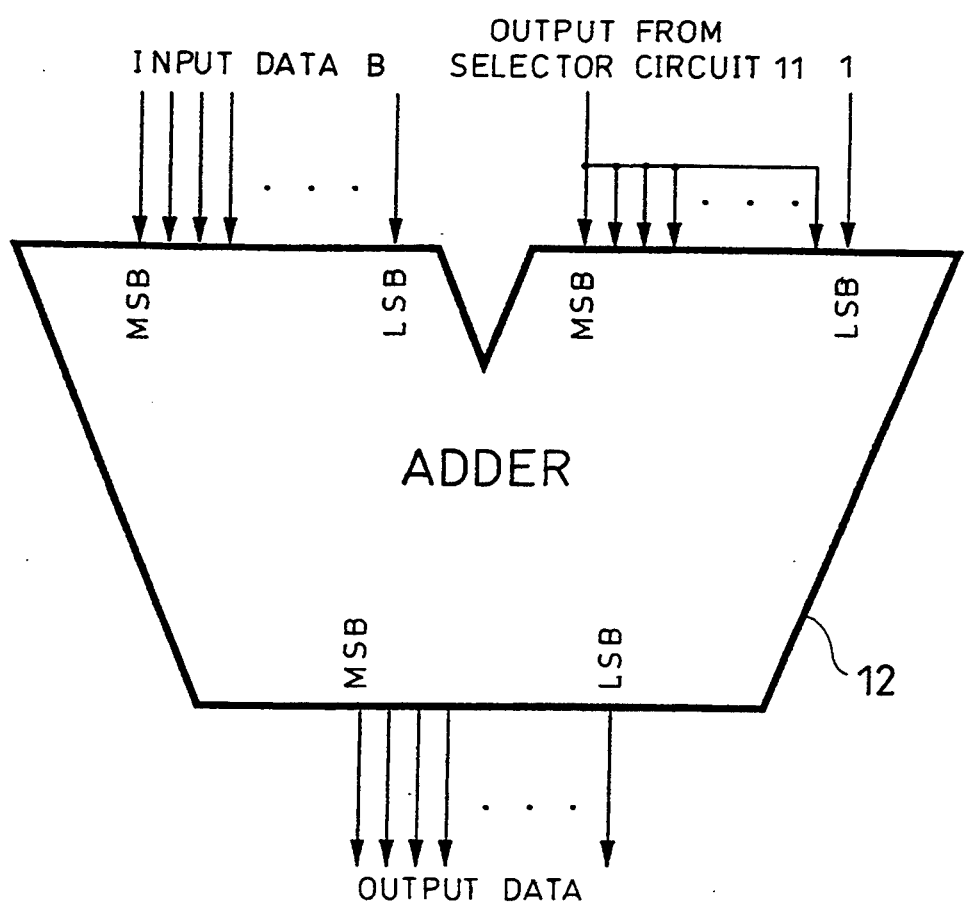
FIG. 2 is a block diagram showing the details of input to the adder shown in FIG. 1.

FIG. 1 shows the structure of an arithmetic unit according to a first embodiment of the present invention. FIG. 2 shows the details of input to the adder shown in FIG. 1.

In FIGS. 1 and 2, the reference numeral 11 denotes a first selector circuit which is used to generate the constant data 1 or −1, the reference numeral 12 denotes an adder having two inputs, the reference numeral 13 denotes a zero-judgment circuit for judging whether input data B is 0 or not, the reference numeral 14 denotes a second selector circuit for selecting either the input data B or an output from the adder 12, and the reference numeral 15 denotes a selector-control circuit for controlling the second selector circuit 14.

First, the following describes the way in which this arithmetic unit operates when executing Operation 1 shown in FIG. 8A.

The first selector circuit 11 outputs the most significant bit of the input data B, in accordance with a control signal which has been sent thereto through a control line. The adder 12 receives the input data B and the output from the first selector circuit 11, adds 1 to the least significant bit of the input data B, and also adds the output from the first selector circuit 11 to all the other bits of the input data B. In other words, if the most significant bit of the input data B is 0, i.e., if the input data B is positive or 0, then the adder 12 adds 1 to the least significant bit of the input data B, and 0 to all the other bits thereof, and accordingly outputs the result of the addition, i.e., B+1. On the other hand, if the most significant bit of the input data B is 1, i.e., if the input data B is negative, then the adder 12 adds 1 to all the bits of the input data B, and accordingly outputs the result of the addition, i.e., B−1.

The zero-judgment circuit 13 judges whether the input data B is 0 or not, and outputs 1 as a flag when B=0. This flag is input, together with the least significant bit of input data A, to the selector-control circuit 15. In accordance with a control signal sent from the selector-control circuit 15, the second selector circuit 14 operates as follows: In the case where the least significant bit of the input data A is 1 or the flag from the zero-judgment circuit 13 is 1, i.e., in the case where the input data A is an odd number or the input data B is 0, the second selector circuit 14 selects the input data B; and in the other cases, it selects the output from the adder 12, i.e., B+1 or B−1.

The arithmetic unit of FIGS. 1 and 2 operates in such a manner as described above, and can accordingly execute Operation 1 shown in FIG. 8A.

Next, the following describes the way in which the arithmetic unit of FIGS. 1 and 2 operates when executing Operation 2 shown in FIG. 8B.

The first selector circuit 11 outputs the inversion of the most significant bit of the input data B, in accordance with a control signal which has been sent thereto through the control line. The adder 12 adds 1 to the least significant bit of the input data B, and also adds the output from the first selector circuit 11 to all the other bits of the input data B. In other words, if the inversion of the most significant bit of the input data B is 1, i.e., if the input data B is positive or 0, then the adder 12 adds 1 to all the bits of the input data B, and accordingly outputs the result of the addition, i.e., B−1. On the other hand, if the inversion of the most significant bit of the input data B is 0, i.e., if the input data B is negative, then the adder 12 adds 1 to the least significant bit of the input data B, and 0 to all the other bits thereof, and accordingly outputs the result of the addition, i.e., B+1.

The zero-judgment circuit 13 judges whether the input data B is 0 or not, and outputs 1 as a flag when B=0. In accordance with a control signal sent from the selector-control circuit 15, the second selector circuit 14 operates as follows: In the case where the least significant bit of the input data A is 1 or the flag from the zero-judgment circuit 13 is 1, i.e., in the case where the input data A is an odd number or the input data B is 0, the second selector circuit 14 selects the input data B; and in the other cases, it selects the output from the adder 12, i.e., B−1 or B+1.

The arithmetic unit of FIGS. 1 and 2 operates in such a manner as described above, and can accordingly execute Operation 2 shown in FIG. 8B.

EXAMPLE 2

Figure 3:
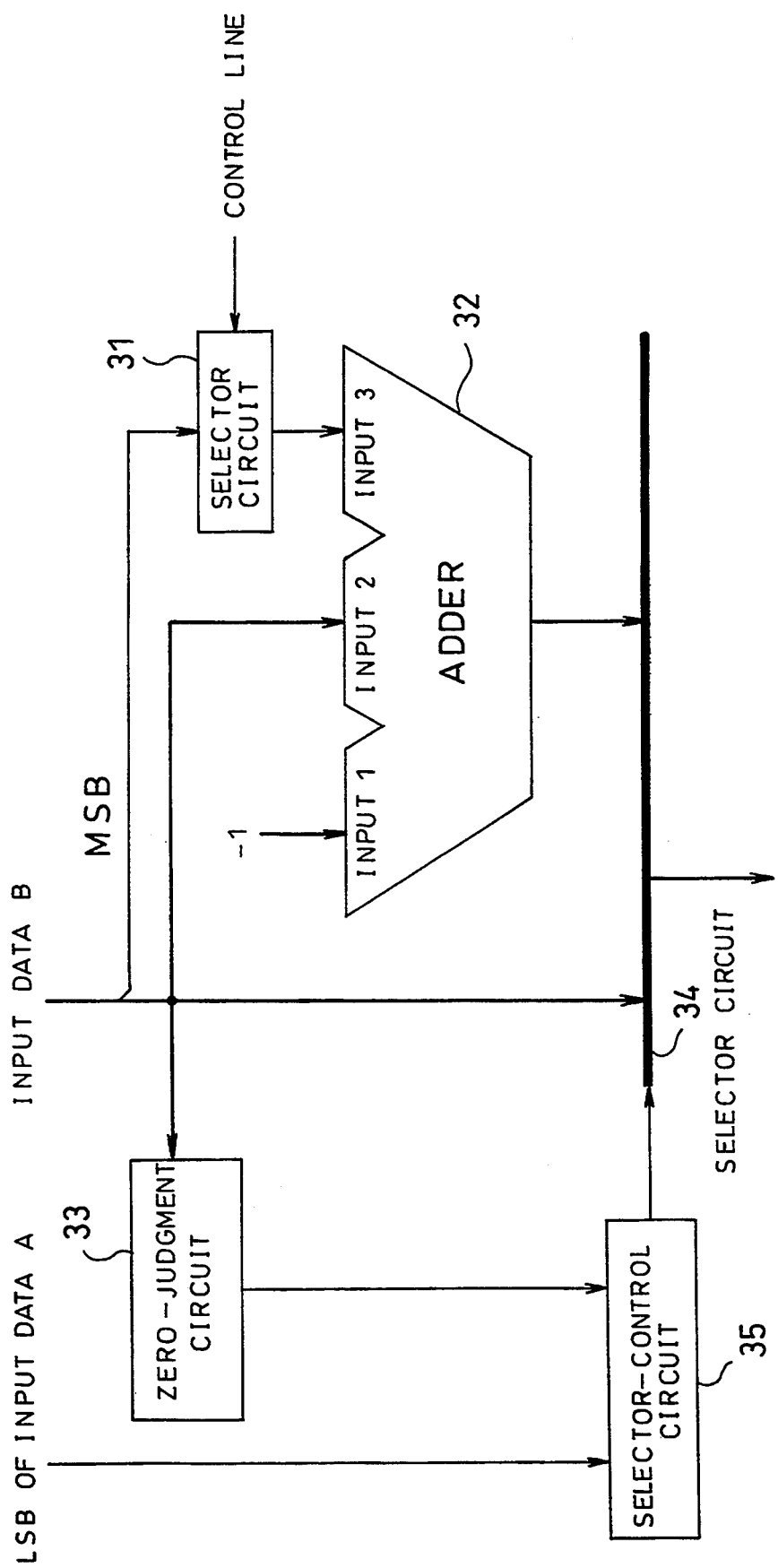
FIG. 3 is a block diagram showing the structure of an arithmetic unit according to a second embodiment of the present invention.

FIG. 3 shows the structure of an arithmetic unit according to a second embodiment of the present invention.

In FIG. 3, the reference numeral 31 denotes a first selector circuit which is used to generate the constant data 2 or 0, the reference numeral 32 denotes an adder having three inputs, the reference numeral 33 denotes a zero-judgment circuit for judging whether input data B is 0 or not, the reference numeral 34 denotes a second selector circuit for selecting either the input data B or an output from the adder 32, and the reference numeral 35 denotes a selector-control circuit for controlling the second selector circuit 34.

First, the following describes the way in which this arithmetic unit operates when executing Operation 1 shown in FIG. 8A.

The first selector circuit 31 outputs the inversion of the most significant bit of the input data B, in accordance with a control signal which has been sent thereto through a control line. The adder 32 receives the constant −1, the input data B and the output from the first selector circuit 31, and adds −1 and the input data B, and then also adds the output from the first selector circuit 31 to the second least significant bit of the result of the addition. In other words, if the inversion of the most significant bit of the input data B is 1, i.e., if the input data B is positive or 0, then the adder 32 adds the input data B, −1 and 2, and accordingly outputs the result of the addition, i.e., B+1. On the other hand, if the inversion of the most significant bit of the input data B is 0, i.e., if the input data B is negative, then the adder 32 adds the input data B, −1 and 0, and accordingly outputs the result of the addition, i.e., B−1.

The zero-judgment circuit 33 judges whether the input data B is 0 or not, and outputs 1 as a flag when B=0. This flag is input, together with the least significant bit of input data A, to the selector-control circuit 35. In accordance with a control signal sent from the selector-control circuit 35, the second selector circuit 34 operates as follows: In the case where the least significant bit of the input data A is 1 or the flag from the zero-judgment circuit 33 is 1, i.e., in the case where the input data A is an odd number or the input data B is 0, the second selector circuit 34 selects the input data B; and in the other cases, it selects the output from the adder 32, i.e., B+1 or B−1.

The arithmetic unit of FIG. 3 operates in such a manner as described above, and can accordingly execute Operation 1 shown in FIG. 8A.

Next, the following describes the way in which the arithmetic unit of FIG. 3 operates when executing Operation 2 shown in FIG. 8B.

The first selector circuit 31 outputs the most significant bit of the input data B, in accordance with a control signal which has been sent thereto through the control line. The adder 32 receives the constant −1, the input data B and the output from the first selector circuit 31, and adds the constant −1 and the input data B, and then also adds the output from the first selector circuit 31 to the second least significant bit of the result of the addition. In other words, if the most significant bit of the input data B is 0, i.e., if the input data B is positive or 0, then the adder 32 adds the input data B, −1 and 0, and accordingly outputs the result of the addition, i.e., B−1. On the other hand, if the most significant bit of the input data B is 1, i.e., if the input data B is negative, the adder 32 adds the input data B, −1 and 2, and accordingly outputs the result of the addition, i.e., B+1.

The zero-judgment circuit 33 judges whether the input data B is 0 or not, and outputs 1 as a flag when B=0. In accordance with a control signal sent from the selector-control circuit 35, the second selector circuit 34 operates as follows: In the case where the least significant bit of the input data A is 1 or the flag from the zero-judgment circuit 33 is 1, i.e., in the case where the input data A is an odd number or the input data B is 0, the second selector circuit 34 selects the input data B; and in the other cases, it selects the output from the adder 32, i.e., B−1 or B+1.

The arithmetic unit of FIG. 3 operates in such a manner as described above, and can accordingly execute Operation 2 shown in FIG. 8B.

EXAMPLE 3

Figure 4:
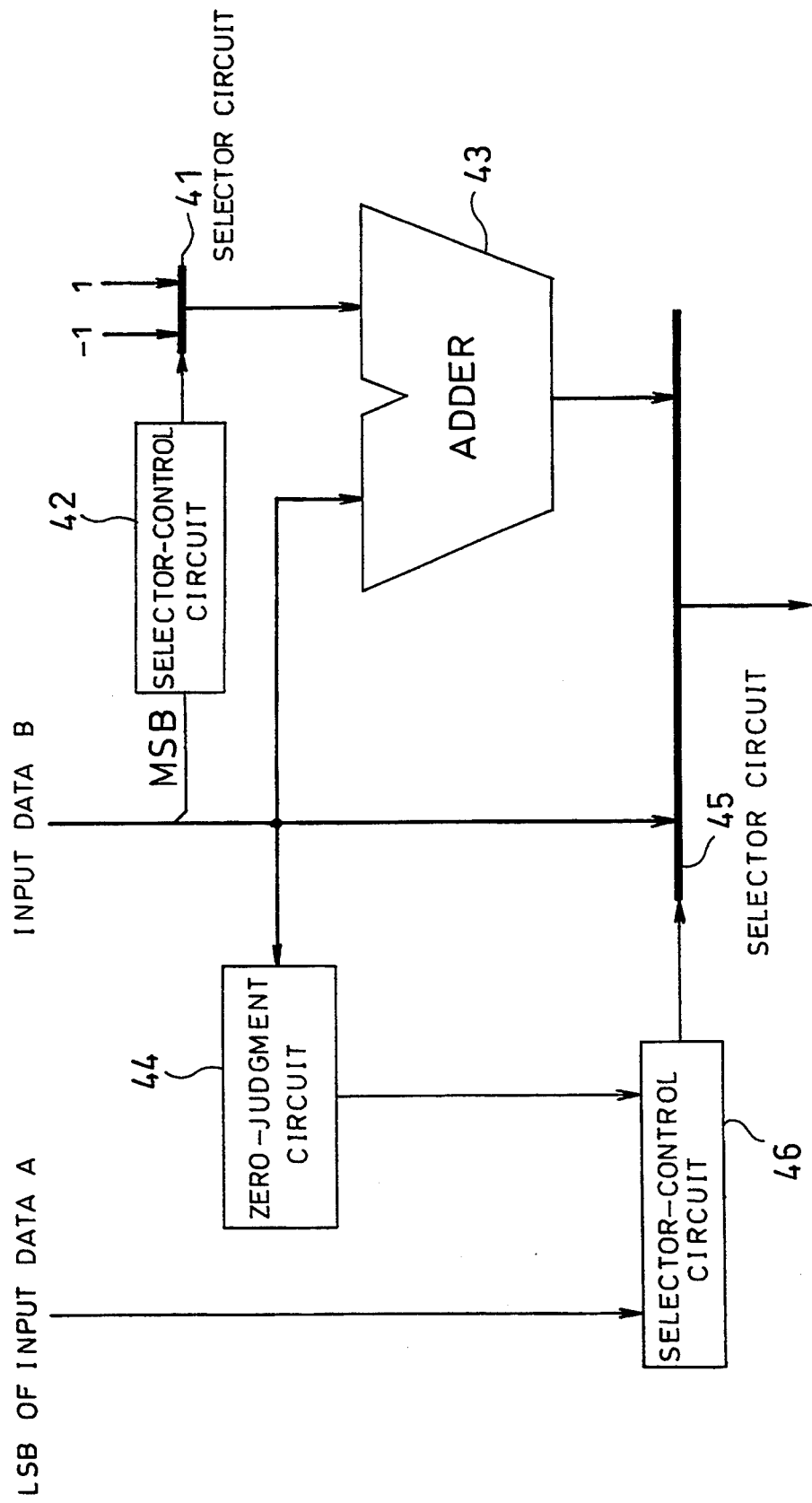
FIG. 4 is a block diagram showing the structure of an arithmetic unit according to a third embodiment of the present invention.

FIG. 4 shows the structure of an arithmetic unit according to a third embodiment of the present invention.

In FIG. 4, the reference numeral 41 denotes a first selector circuit for selecting either the constant 1 or the constant −1, the reference numeral 42 denotes a first selector-control circuit for controlling the first selector circuit 41, the reference numeral 43 denotes an adder having two inputs, the reference numeral 44 denotes a zero-judgment circuit for judging whether input data B is 0 or not, the reference numeral 45 denotes a second selector circuit for selecting either the input data B or an output from the adder 43, and the reference numeral 46 denotes a second selector-control circuit for controlling the second selector circuit 45.

First, the following describes the way in which this arithmetic unit operates when executing Operation 1 shown in FIG. 8A.

In accordance with a control signal sent from the first selector-control circuit 42, the first selector circuit 41 operates as follows: In the case where the most significant bit of the input data B is 0, i.e., in the case where the input data B is positive or 0, the first selector circuit 41 outputs 1; and in the case where the most significant bit of the input data B is 1, i.e., in the case where the input data B is negative, the first selector circuit 41 outputs −1. The adder 43 adds the input data B and the output from the first selector circuit 41. Thus, the adder 43 outputs B+1 when the input data B is positive or 0, and outputs B−1 when it is negative.

The zero-judgment circuit 44 judges whether the input data B is 0 or not, and outputs 1 as a flag when B=0. This flag is input, together with the least significant bit of input data A, to the second selector-control circuit 46. In accordance with a control signal sent from the second selector-control circuit 46, the second selector circuit 45 operates as follows: In the case where the least significant bit of the input data A is 1 or the flag from the zero-judgment circuit 44 is 1, i.e., in the case where the input data A is an odd number or the input data B is 0, the second selector circuit 45 selects the input data B; and in the other cases, it selects the output from the adder 43, i.e., B+1 or B−1.

The arithmetic unit of FIG. 4 operates in such a manner as described above, and can accordingly execute Operation 1 shown in FIG. 8A.

Next, the following describes the way in which the arithmetic unit of FIG. 4 operates when executing Operation 2 shown in FIG. 8B.

In accordance with a control signal sent from the first selector-control circuit 42, the first selector circuit 41 operates as follows: In the case where the most significant bit of the input data B is 0, i.e., in the case where the input data B is positive or 0, the first selector circuit 41 outputs −1; and in the case where the most significant bit of the input data B is 1, i.e., in the case where the input data B is negative, the first selector circuit 41 outputs 1. The adder 43 adds the input data B and the output from the first selector circuit 41. Thus, the adder 43 outputs B−1 when the input data B is positive or 0, and outputs B+1 when it is negative.

The zero-judgment circuit 44 judges whether the input data B is 0 or not, and outputs 1 as a flag when B=0. In accordance with a control signal sent from the second selector-control circuit 46, the second selector circuit 45 operates as follows: In the case where the least significant bit of the input data A is 1 or the flag from the zero-judgment circuit 44 is 1, i.e., in the case where the input data A is an odd number or the input data B is 0, the second selector circuit 45 selects the input data B; and in the other cases, it selects the output from the adder 43, i.e., B−1 or B+1.

The arithmetic unit of FIG. 4 operates in such a manner as described above, and can accordingly execute Operation 2 shown in FIG. 8B.

EXAMPLE 4

Figure 5:
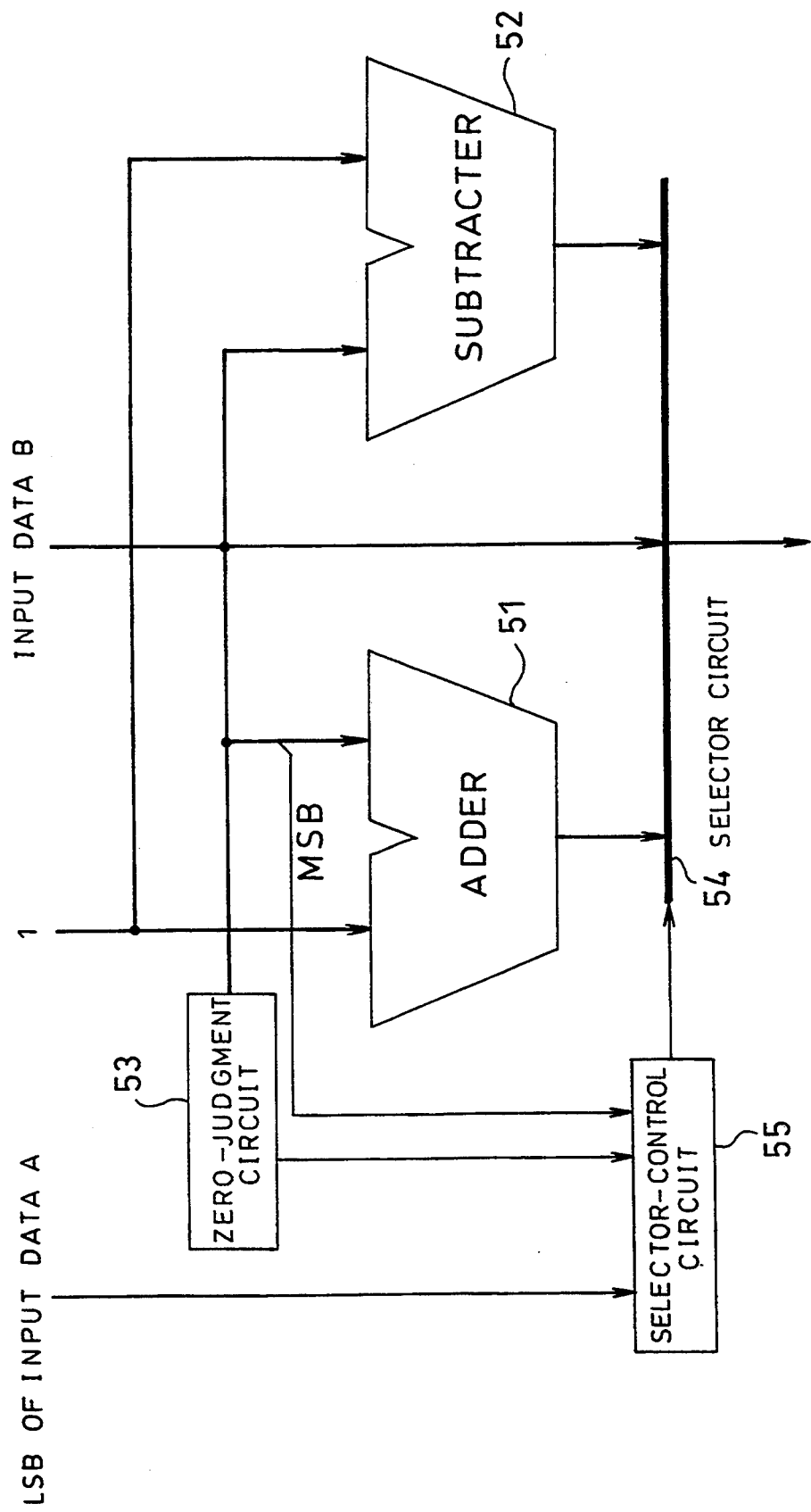
FIG. 5 is a block diagram showing the structure of an arithmetic unit according to a forth embodiment of the present invention.
Figure 6:
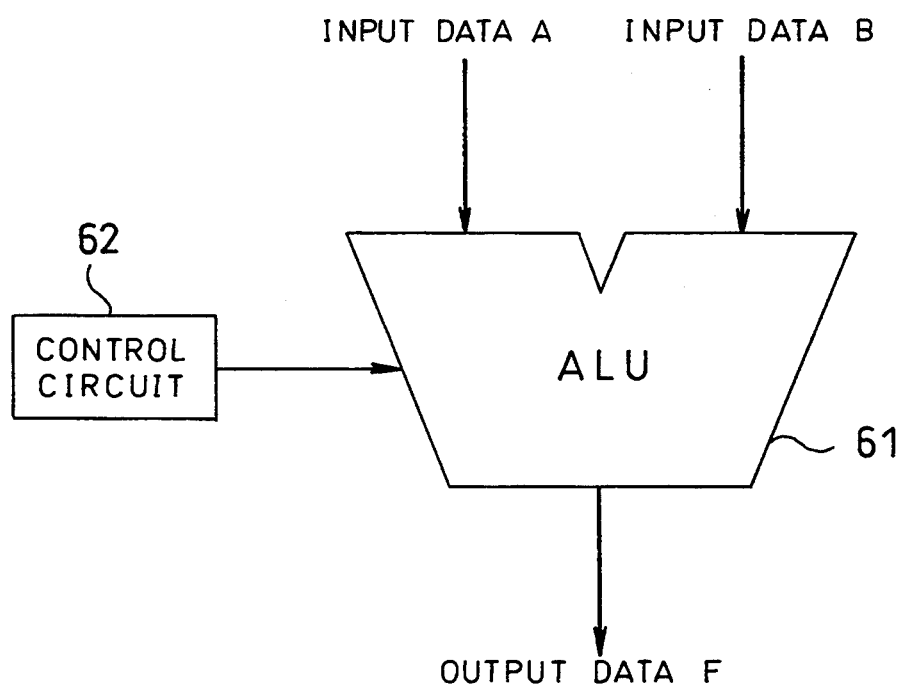
FIG. 6 is a block diagram showing the basic structure of arithmetic-logic section of a conventional signal processor.
Figure 7:
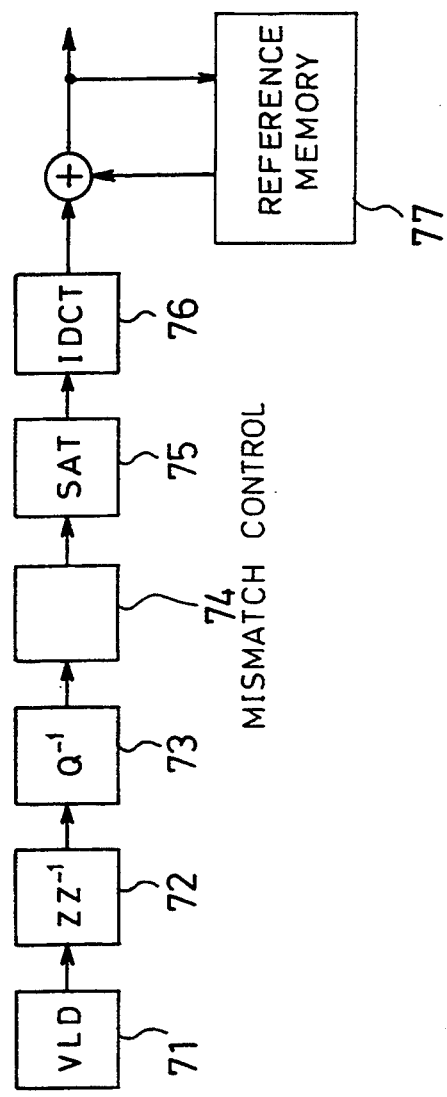
FIG. 7 is a data flow diagram illustrating an image data decoding process.

FIG. 5 shows the structure of an arithmetic unit according to a fourth embodiment of the present invention.

In FIG. 5, the reference numeral 51 denotes an adder for adding 1 to input data B, the reference numeral 52 denotes a subtracter for subtracting 1 from the input data B, the reference numeral 53 denotes a zero-Judgment circuit for judging whether the input data B is 0 or not, the reference numeral 54 denotes a selector circuit for selecting either the input data B, the output from the adder 51 or the output from the subtracter 52, and the reference numeral 55 denotes a selector-control circuit for controlling the selector circuit 54.

First, the following describes the way in which this arithmetic unit operates when executing Operation 1 shown in FIG. 8A.

The adder 51 and the subtracter 52 output B+1 and B−1, respectively. The zero-judgment circuit 53 judges whether the input data B is 0 or not, and outputs 1 as a flag when B=0. This flag is input, together with the least significant bit of input data A, to the selector-control circuit 55.

In the case where the least significant bit of the input data A is 1 or the flag from the zero-judgment circuit 53 is 1, i.e., in the case where the input data A is an odd number or the input data B is 0, the selector-control circuit 55 controls the selector circuit 54 so as to allow it to select the input data B. In the case where the least significant bit of the input data A is 0 and the flag from the zero-judgment circuit 53 is 0, i.e., in the case where the input data A is an even number and the input data B is not 0, the selector-control circuit 55 operates as follows: If the most significant bit of the input data B is 0 (i.e., if the input data B is positive), then the selector-control circuit 55 allows the selector circuit 54 to select the output from the adder 51, i.e., B+1; and if the most significant bit of the input data B is 1 (i.e., if the input data B is negative), then the selector-control circuit 55 allows the selector circuit 54 to select the output from the subtracter 52, i.e., B−1.

The arithmetic unit of FIG. 5 operates in such a manner as described above, and can accordingly execute Operation 1 shown in FIG. 8A.

Next, the following describes the way in which the arithmetic unit of FIG. 5 operates when executing Operation 2 shown in FIG. 8B.

The adder 51 and the subtracter 52 output B+1 and B−1, respectively. The zero-judgment circuit 53 judges whether the input data B is 0 or not, and outputs 1 as a flag when B=0.

In the case where the least significant bit of the input data A is 1 or the flag from the zero-judgment circuit 53 is 1, i.e., in the case where the input data A is an odd number or the input data B is 0, the selector-control circuit 55 controls the selector circuit 54 so as to allow it to select the input data B. In the case where the least significant bit of the input data A is 0 and the flag from the zero-judgment circuit 53 is 0, i.e., in the case where the input data A is an even number and the input data B is not 0, the selector-control circuit 55 operates as follows: If the most significant bit of the input data B is 0 (i.e., if the input data B is positive), then the selector-control circuit 55 allows the selector circuit 54 to select the output from the subtracter 52, i.e., B−1; and if the most significant bit of the input data B is 1 (i.e., if the input data B is negative), then the selector-control circuit 55 allows the selector circuit 54 to select the output from the adder 51, i.e., B+1.

The arithmetic unit of FIG. 5 operates in such a manner as described above, and can accordingly execute Operation 2 shown in FIG. 8B.

In all the above-described embodiments, the zero-judgment circuits 13, 33, 44 and 53 set the flags to 1 when the input data B is 0. But it is also possible that these flags are set to 0 when the input data B is 0.

We claim:

1. An arithmetic unit for executing, in quantization and inverse quantization of data, a conditional branch operation by which 1 is added to or subtracted from first input data so that the result is output, or the first input data is output, depending on whether the first input data is positive, negative or zero, and also depending on whether second input data is an even number or an odd number, said arithmetic unit comprising:

a first selector circuit which receives the most significant bit of said first input data, and then, in accordance with a first control signal, selects and outputs either the thus received most significant bit or the inversion thereof;

an adder which receives said first input data and the output from said first selector circuit, and then adds 1 to the least significant bit of said first input data and also adds the output from said first selector circuit to all the other bits of said first input data, and thereafter outputs the result of the addition;

a second selector circuit which receives said first input data and the output from said adder, and selects, in accordance with a second control signal, either said first input data or the output from said adder, and then outputs it as an output from said arithmetic unit;

a zero-judgment circuit which receives said first input data, and judges whether it is 0 or not, and then, if it is 0, sets a flag to a predetermined value; and a selector-control circuit which receives the least significant bit of said second input data and the flag from said zero-judgment circuit, and then provides said second control signal to said second selector circuit so as to allow it to select said first input data in the case where the least significant bit of said second input data is 1 or the flag from said zero-judgment circuit is set to the predetermined value, and to select, in the other cases, the output from said adder.

2. An arithmetic unit for executing, in quantization and inverse quantization of data, a conditional branch operation by which 1 is added to or subtracted from first input data so that the result is output, or the first input data is output, depending on whether the first input data is positive, negative or zero, and also depending on whether second input data is an even number or an odd number, said arithmetic unit comprising:

a first selector circuit which receives the most significant bit of said first input data, and then, in accordance with a first control signal, selects and outputs either the thus received most significant bit or the inversion thereof;

an adder which receives the constant data −1, said first input data and the output from said first selector circuit, and adds said constant data and said first input data, and also adds the output from said first selector circuit to the second least significant bit of the result of the addition, and then outputs the final result of these additions;

a second selector circuit which receives said first input data and the output from said adder, and selects, in accordance with a second control signal, either said first input data or the output from said adder, and then outputs it as an output from the arithmetic unit;

a zero-judgment circuit which receives said first input data, and judges whether it is 0 or not, and then, if it is 0, sets a flag to a predetermined value; and a selector-control circuit which receives the least significant bit of said second input data and the flag from said zero-judgment circuit, and then provides said second control signal to said second selector circuit so as to allow it to select said first input data in the case where the least significant bit of said second input data is 1 or the flag from said zero-judgment circuit is set to the predetermined value, and to select, in the other cases, the output from said adder.

3. An arithmetic unit for executing, in quantization and inverse quantization of data, a conditional branch operation by which 1 is added to or subtracted from first input data so that the result is output, or the first input data is output, depending on whether the first input data is positive, negative or zero, and also depending on whether second input data is an even number or an odd number, said arithmetic unit comprising:

a first selector circuit which receives 1 and −1 as first and second constant data, respectively, and then, in accordance with a first control signal, selects and outputs either said first constant data or said second constant data;

a first selector-control circuit which receives the most significant bit of said first input data, and then provides said first control signal to said first selector circuit so as to allow it to select the first or second constant data depending on whether the most significant bit of said first input data is 1 or 0;

an adder which receives said first input data and the output from said first selector circuit, adds said first input data and the output from said first selector circuit, and outputs the result of the addition;

a second selector circuit which receives said first input data and the output from said adder, and selects, in accordance with a second control signal, either said first input data or the output from said adder, and then outputs it as an output from the arithmetic unit;

a zero-judgment circuit which receives said first input data, and judges whether it is 0 or not, and then, if it is 0, sets a flag to a predetermined value; and a second selector-control circuit which receives the least significant bit of said second input data and the flag from said zero-judgment circuit, and then provides said second control signal to said second selector circuit so as to allow it to select said first input data in the case where the least significant bit of said second input data is 1 or the flag from said zero-judgment circuit is set to the predetermined value, and to select, in the other cases, the output from said adder.

4. An arithmetic unit for executing, in quantization and inverse quantization of data, a conditional branch operation by which 1 is added to or subtracted from first input data so that the result is output, or the first input data is output, depending on whether the first input data is positive, negative or zero, and also depending on whether second input data is an even number or an odd number, said arithmetic unit comprising:

an adder which receives said first input data and the constant data 1, adds said first input data and said constant data, and outputs the result of the addition;

a subtracter which receives said first input data and the constant data 1, subtracts said constant data from said first input data, and outputs the result of the subtraction;

a selector circuit which receives said first input data and the outputs from both said adder and said subtracter, and selects, in accordance with a control signal, either said first input data, the output from said adder or the output from said subtracter, and then outputs it as an output from the arithmetic unit;

a zero-judgment circuit which receives said first input data, and judges whether it is 0 or not, and then, if it is 0, sets a flag to a predetermined value; and a selector-control circuit which receives the least significant bit of said second input data, the flag from said zero-judgment circuit and the most significant bit of said first input data, and then provides said control signal to said selector circuit so as to allow it to select said first input data in the case where the least significant bit of said second input data is 1 or the flag from said zero-judgment circuit is set to the predetermined value, and to select, in the other cases, either the output from said adder or the output from said subtracter depending on whether the most significant bit of said first input data is 1 or 0.

* * * * *

UNITED STATES PATENT AND TRADEMARK OFFICE
CERTIFICATE OF CORRECTION

PATENT NO. : 5,432,726
DATED : July 11, 1995
INVENTOR(S) : Shun-ichi KUROHMARU et al.

It is certified that error appears in the above-indentified patent and that said Letters Patent is hereby corrected as shown below:

Col. 1, line 5, in the title, change, "... QUANTIGATION"

to --QUANTIZATION--.

Signed and Sealed this

Twenty-fifth Day of March, 1997

Attest:

BRUCE LEHMAN

*Attesting Officer*     *Commissioner of Patents and Trademarks*